March 4, 1941.  J. H. PACE  2,234,082
DUAL CONTROL FOR AUTOMOBILES
Filed Oct. 24, 1939  3 Sheets-Sheet 1
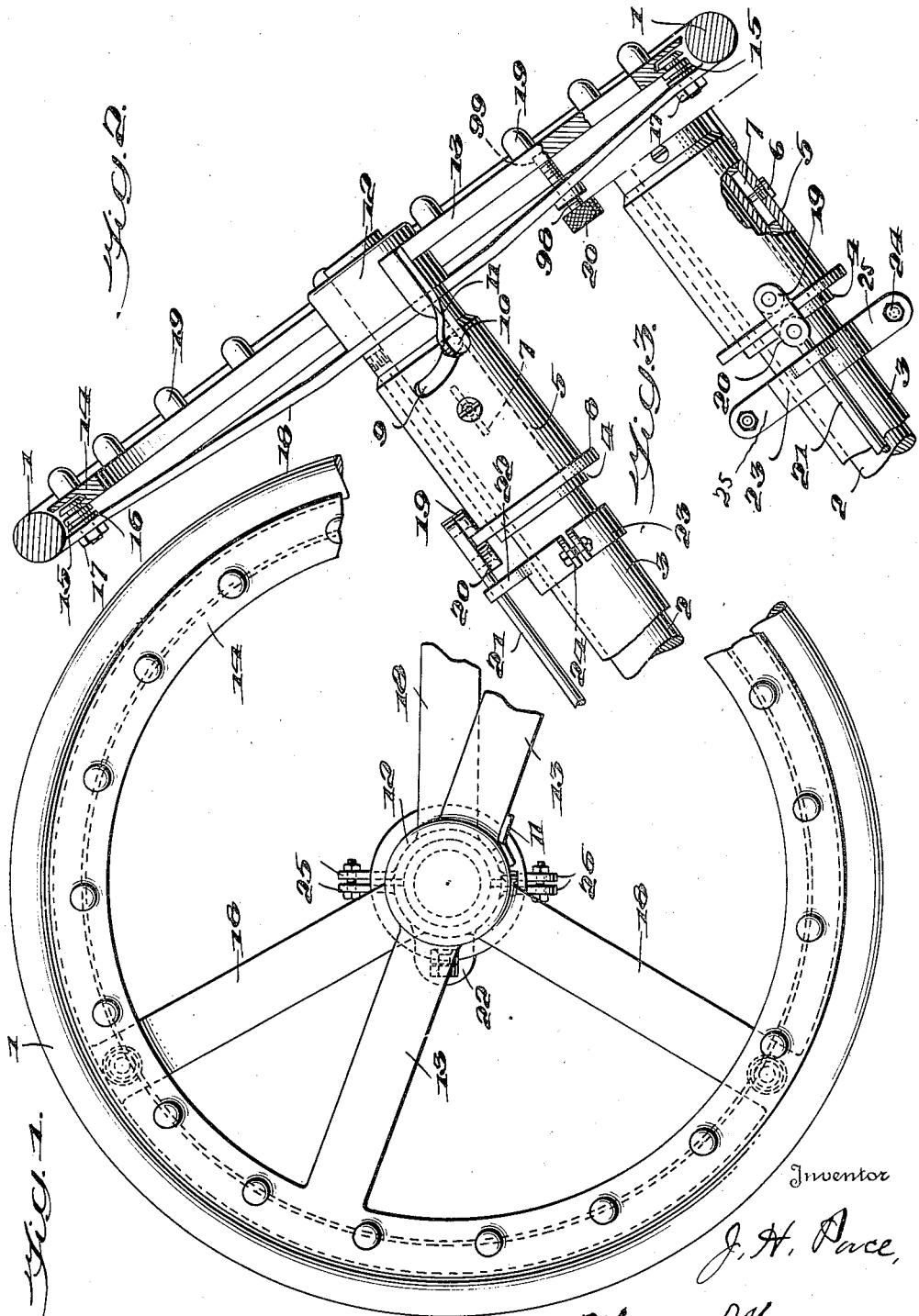

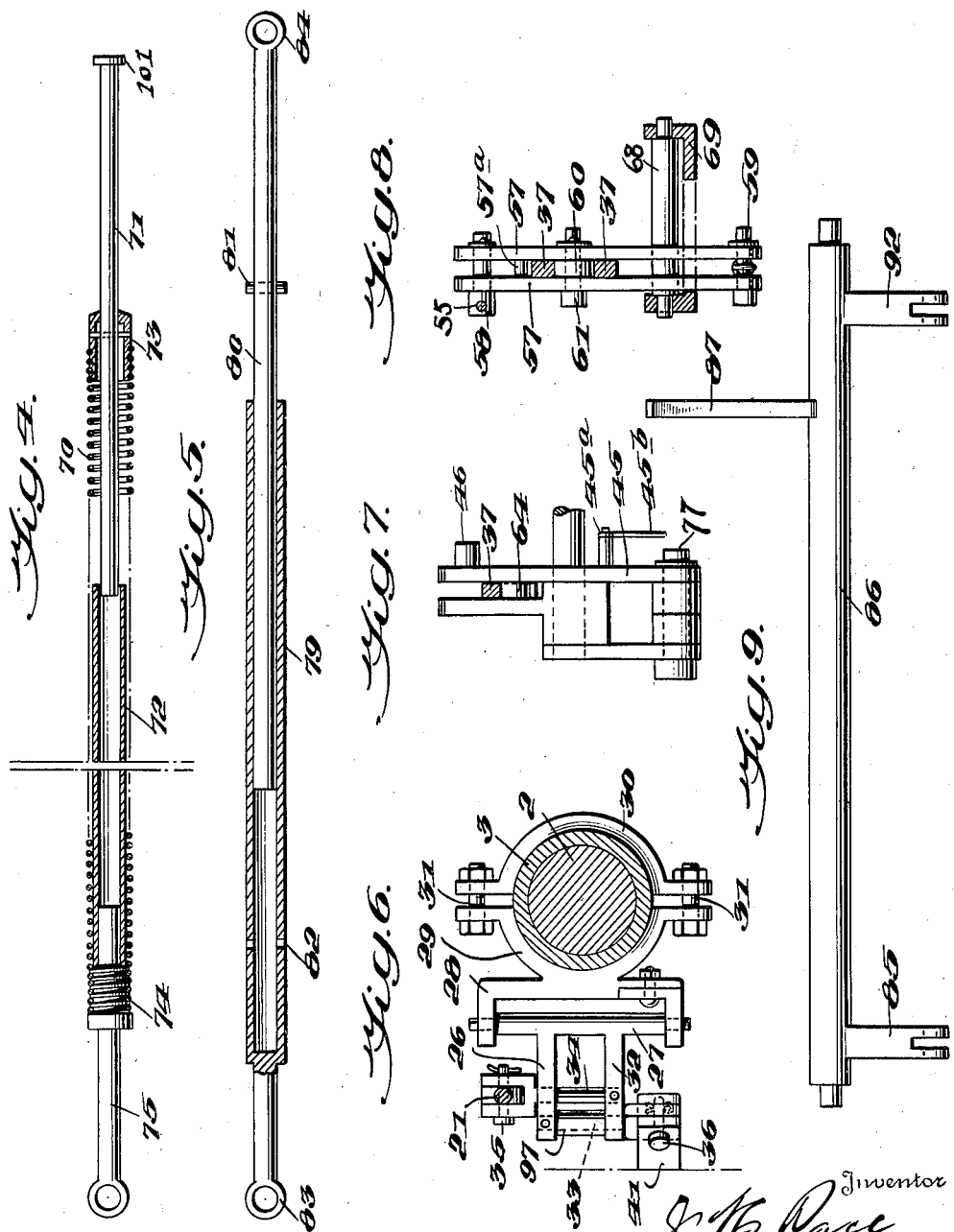

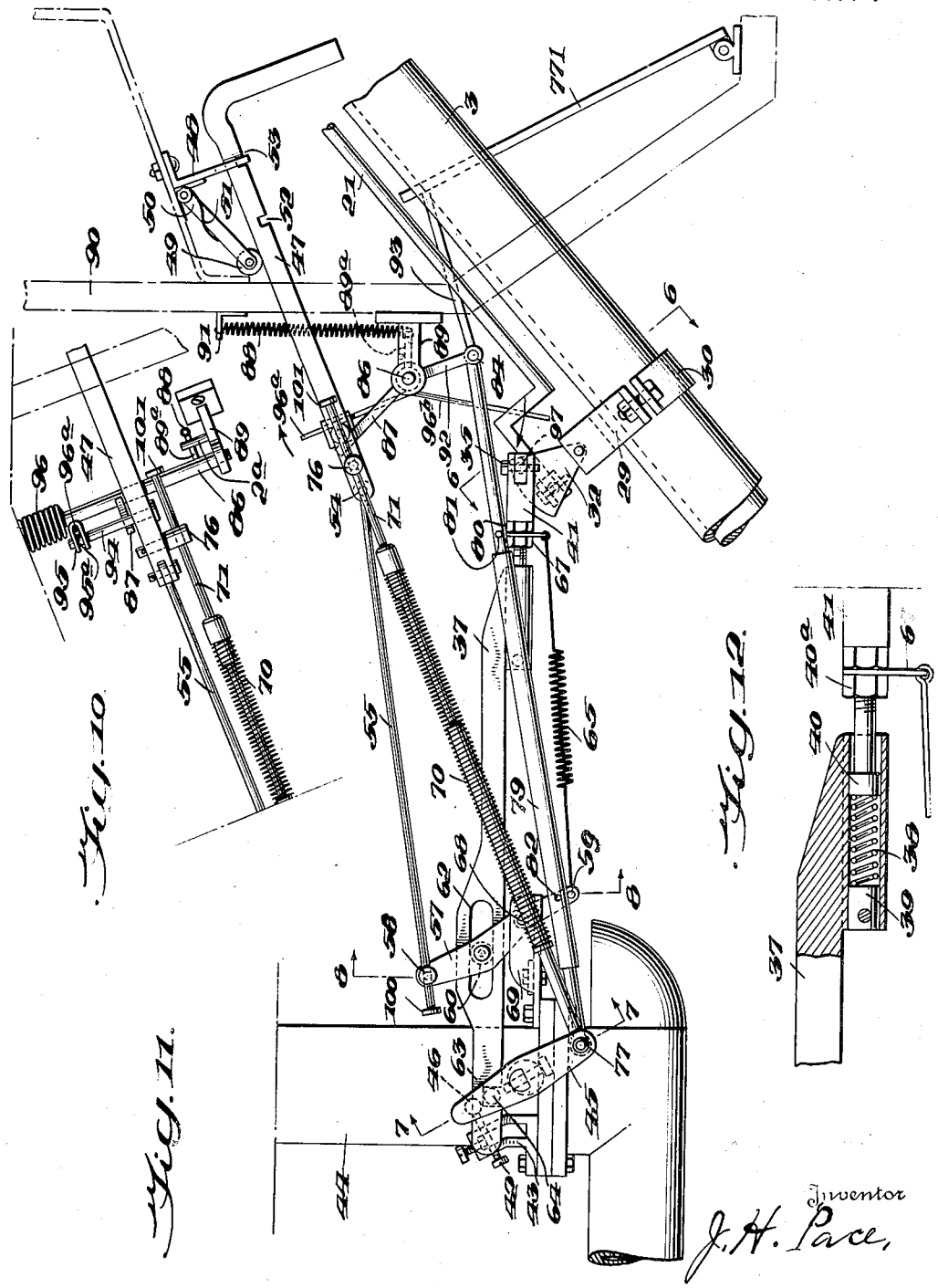

Patented Mar. 4, 1941

2,234,082

UNITED STATES PATENT OFFICE 2,234,082

DUAL CONTROL FOR AUTOMOBILES

James Haralson Pace, Avondale Estates, Ga.

Application October 24, 1939, Serial No. 301,061

11 Claims. (Cl. 74—482)

This invention relates to controlling devices for motor vehicles of the type where the controls are located on the steering wheel, and embodies certain improvements on the dual controlling mechanisms disclosed in my prior U. S. Letters Patent No. 1,556,302, granted October 6, 1925 and No. 1,641,779, granted September 6, 1927.

As disclosed in said prior U. S. Letters Patents, a control ring is used mounted in guideways on the steering wheel, with thumb grips located at convenient intervals of space thereon to be moved by the thumb or thumbs of the driver. Preferably, the circular movement of this ring is approximately 90°, more or less, and the construction is such that the control ring moves with the steering wheel in the act of guiding the car without affecting the gas supply, and yet controls the gas supply when moved independently of the steering wheel.

Among the advantages of this system of gas control is the fact that it allows the right foot to stay on the brake if so desired, while the thumbs control the gas supply, thereby giving simultaneous control of the gas and the brake, instead of the necessary consecutive or alternating control of these functions required in foot control driving. This control in driving eliminates the exhausting necessity of holding down a foot control pedal, removes the danger of stepping on the gas for the brake by mistake, and allows a quicker braking and stopping within a shorter distance after the danger signal has been given, than is possible in foot control driving. This follows from the fact that the right foot does not lose time in moving from the accelerator pedal to the brake pedal in the so-called reaction time of foot control driving. Moreover, it permits the car to be started up hill without first rolling backward as it frequently does in foot control driving of the ordinary type. In the case of backing the car, the new control permits the driver to extend his body backward and upward a greater distance than is possible in foot control driving, thereby giving a wider and better view of the road and ground back of the car, so essential in safe backing of automobiles.

The improved device also permits a uniform control of the gas supply which is unaffected by jars from riding over rough roads.

The present invention involves certain improvements over the prior constructions, as instead of employing a rod inside the steering post for transmitting the motion of the control ring to the carburetor, the present construction employs a rod outside that post for the same purpose, such new situation preventing interference by the rod with the functions of the control tubes, ordinarily located inside the steering post, and is thus more accessible for adjustment or repairs.

Under the present construction the control ring, instead of being located some distance from the rim of the steering wheel, employs a ring which is located as close to the rim of the wheel as it can conveniently be placed without friction therewith, thereby making it impossible for a finger to be caught between the steering wheel and control ring.

A serious difficulty in my former constructions, as exhibited in the above-mentioned patents, was that a foot control spring which was used to close the carburetor in both foot and thumb control use, in exerting its tension on the control ring, gave too much resistance to its movement for easy operation, if the spring was strong enough to close the carburetor satisfactorily. In the present construction the carburetor is closed in thumb control use automatically by the return movement of the control ring in closing the throttle, without the tension of a foot control spring. This has the advantage of removing the objectionable resistance to the movement of the control ring which was imparted to it by the tension of such a spring, in the older devices. This is accomplished by means whereby the driver is enabled to shift the mechanism for thumb control use to the mechanism for foot control use, or vice versa. Such selection of mechanism for controlling the carburetor permits the driver to start with foot control, with which he is already familiar, and when out on the open road to begin to use thumb control with the control ring that operates easily, and without the resistance of the foot control pedal spring, referred to. The shift can be made quickly and easily, and without stopping the car, if so desired.

Another feature of improvement over my former constructions is the use of round posts on the control ring, instead of the thumb grips in the form of radial ridges. These posts are preferably covered with rubber for better thumb contact in all positions of the steering wheel, and enable the necessary pressure to be applied to the ring through the operator's thumbs with greater ease and comfort, than was possible with the former constructions.

Another important feature of my invention is found in the means for locking the control ring rigidly with the steering wheel in foot control use, if so desired. Although the movement of the control ring does not affect the gas supply when the adjustment is set for foot control, I have provided a means for automatically increasing the resistance to the movement of the control ring in foot control use to a degree of pressure that will act as a warning to the driver that he must adjust it as he wants it to be, if he has failed to do so beforehand.

In former constructions the control ring moved in simple guideways on the spokes of the steering wheel, but an important feature of the present invention resides in a construction in which the ring moves in the circular grooves of anti-friction rollers which are mounted on the spokes of the steering wheel, for diminishing friction and securing easier operation.

Another important feature of the invention is found in a method of automatically locking the foot control pedal when the device is set for thumb control, and so as to prevent a confusion of these two functions.

Other features and advantages of the invention, such as improved details of construction and combinations of parts, will more fully appear from the following description, when considered in connection with the accompanying drawings, in which:

Figure 1 is a plan view of the steering wheel and control ring, with certain parts broken away;

Figure 2 is a side elevation of the steering wheel, partly sectional, illustrating a downward tubular extension of the hub of the wheel, and the cylindrical collar for transmitting the motion of the control ring to the carburetor through the gas rods;

Figure 3 is a detail view in side elevation, partly sectional, of the upper portion of the steering post showing the sliding cylindrical collar, and connections to the gas control rod;

Figure 4 is a view in side elevation, partly sectional, of the foot control spring assembly and its parts;

Figure 5 is a view in side elevation, partly sectional, of the tube and rod assembly connecting the lever which operates the throttle with a projection from a supplementary shaft leading to the foot control pedal;

Figure 6 is a plan view, partly sectional through the steering column, showing the rocking arm, and lever connection between the gas rod and carburetor lever;

Figure 7 is a detail view in front elevation of the carburetor lever and connections, for thumb and foot control, respectively, and optionally for needle of carburetor.

Figure 8 is an edge view of the lifting lever for lifting the gas rod from connection with the carburetor lever in foot control use;

Figure 9 is a view in side elevation, of the supplementary shaft that is intermediate the foot control pedal and the tube and rod assembly leading to the carburetor lever;

Figure 10 is a detail view showing in plan the shifting rod, and certain parts associated therewith;

Figure 11 is a view in side elevation of the mechanism used for shifting between thumb and foot control adjustment, and Figure 12 is a detail view, partly in perspective, of certain parts shown in Figure 11.

The steering wheel 1 is provided with the ordinary steering wheel post 2, which is surrounded by a casing 3. A cylindrical sliding collar 5 is fitted to slide lengthwise on a tubular extension 4 of the hub of the steering wheel. This sliding collar 5 is provided with a cam slot 9 which receives an anti-friction roller 10, carried at the lower end of an arm 11 which is made integral with the hub 12. The hub 12 is connected, as by spokes 13, to the control ring 14, which latter is fitted snugly within the steering wheel 1 and has its outer peripheral portion recessed, thereby forming the two annular rims, the lower one of which fits in the annular grooves of the anti-friction rollers 15. These rollers are each provided with a base 16 extending downwardly as a short bolt threaded to receive a nut 17, the bolts entering holes in the spokes 18 of the steering wheel, the rollers being firmly clamped to the spokes by tightening the nut 17. Each bolt has a hole running lengthwise, through which the shaft of a roller 15, with an annular groove therein, receives the circular edge of the control ring.

The ring is provided with a plurality of thumb grips 19 which may, if desired, be covered with rubber or some cushioning material, and are adapted to be engaged by the operator's thumbs for turning the ring, in either direction.

In addition to the cam slot 9 in the sliding collar 5, the latter is provided with a screw 6 having thereon an anti-friction roller which enters a vertical guiding slot 7 in the tubular extension 4, so that turning the ring 14 through the arm 11, effects movement of the anti-friction roller 10 in the cam slot 9 and moves the collar in an upward or in a downward direction.

A circular shoulder 8 is provided at the bottom of the sliding collar 5 which is located between anti-friction rollers 19, 20, on the upper end of the gas control rod 21, which slides through a guide eye in a lug 22, projecting from a two-part clamping collar 23, clamped to the casing 3 which surrounds the steering post, by screws 24, passing through lugs 25 projecting from the two parts of the collar, as shown. As the sliding collar moves up or down from motion imparted to it from the control ring, the motion of said collar is imparted to the rod 21. The lower end of this rod is pivoted to one arm 26 Figure 6 of an intermediate lever which is integral with the shaft 27, having bearings in a forked bracket 28, which is integral with one-half 29 of a clamp, the other half 30 of the clamp being, with the half 29, held by bolts 31 and nuts thereon, to the casing 3 of the steering column, as shown in Fig. 6. Projecting from the shaft 27 of the intermediate lever is another arm 32. Pivoted members 33 and 34 have connection through pivot pins 35, 36, respectively, with the lower end portion of the gas control rod 21 and the gas rod extension 37, the latter being provided (see Fig. 12), with a recess containing a spiral spring 38 which is confined between an abutment 39 in said recess and a plunger head 40 which forms a part of the extension gas rod. The plunger rod 40 has threaded connection with a forked member 41 to which it is held by a retaining nut 40a. The forked member 41 is connected through a pin 36 with the pivot pin 33, through which means is secured the inner end of said gas rod extension 37 to the arm 32 of the intermediate lever. The spring 38, acting upon the plunger 40, serves as a cushioning member to lessen the shock of the return action of the gas rod in closing the throttle valve of the carburetor. The forked member 28 is divided to allow the insertion of the shaft 27 in its bearings, the parts being held together by a bolt as shown.

The connections between the end portions, respectively, of the gas rod 21, 37, through the forked members and arms of the intermediate lever, compensate for the change in direction between the two members of the gas rod, and enable the up and down movements of the rod 21 to be transmitted and converted into horizontal movements in the lower gas rod member 37, as will be obvious.

In the turning movements of the steering wheel in driving the car, the shoulder 8 at the bottom of the sliding collar 5 merely rotates between the rollers 19, 20, without imparting any lengthwise motion to the gas rod 21, and hence is without any effect on the gas supply. As the clockwise motion of the control ring 14 effects a corresponding clockwise movement of the carburetor lever 45, and thus increases the gas supply, an opposite movement will diminish that supply and reduce it to a point for idling, secured by a conventional limit screw 42 threaded through a bracket 43, which is herein shown as clamped to a flange at the base of the intake column 44.

The carburetor lever 45 is provided with a stud 46 which comes in contact with the stop screw 42 to limit the movement of the lever. To secure more leverage for the control ring in closing the gas to the idling point against the resistance of the compression spring 38, a small portion of the upper end of the spiral cam 9 in the sliding collar 5, rises at a lower rate than the rest of the cam.

In the improved form of this invention it is possible to remove the tension of the foot control spring from the throttle valve and the control ring 14, so that such tension will not prevent an easy, comfortable movement of the ring by the thumb. This is accomplished by a shift of adjustment of a shift member 47, Figure 11, the handle of which is located under the instrument panel and within easy reach of the left hand of the driver. This shift member is made of a square rod so that it will not turn in its square guideway, and the upper end of the rod is received in the square hole of a bracket 48, Fig. 11, fastened to the body of the car. The lower end of the rod passes through a square hole in the wall 90 separating the space for the motor from that of the driver. This shift rod is borne downwardly by a spring-pressed roller 49, Fig. 11, carried by an oscillating arm 50 pivoted to a portion of the frame, the rod and roller being impelled downwardly by a spring 51, which causes the rod to rest in either of its two notches, 52, 53, in the lower edge of the bracket 48.

When the upper notch is in engagement with the bracket, the rod is in position for thumb control adjustment of the throttle, and when the lower notch is in engagement with the bracket, the parts are in the proper position for foot control of the throttle.

Fastened to the lower end of this shift rod is a pivot 54, to which is connected a rod 55, the other end of which passes through the head of a pin 58 in the lifting lever 57, a side view of which is shown in Figure 11 of the drawings, and an edgewise view in Figure 8. This lifting lever is formed of two parallel members, which are held together in spaced relation by a pin 57a and the shaft made integral therewith. Within the two sides of this lifting lever is a roller 60 held by a pin 61 inserted through its two sides, and the lower gas rod member 37 is inserted in the space between the two members of the lever 57 and is provided with a slot 62 within which is located the roller 60, as best shown in Figure 8. The left end of the gas rod 37 is provided with a rectangular opening 63 which is adapted to fit over a pin 64 in the carburetor lever 45. A spring 65, Figure 11, is connected at the left hand end with a pin 59 at the lower end of the lifting lever 57, and the right hand of this spring is shown as fastened to an arm 67, Figure 12, which is clamped between the plunger 40 and fork 41 of the gas rod section 37. This spring is for the purpose of holding the rectangular opening 63 in the gas rod member 37 in engagement with the pin 64 on the carburetor lever, to give proper resistance to the movement of the control ring, and to prevent vibration.

The lifting lever 57 oscillates on a shaft 68, Figure 8, which is fastened rigidly to the lever. The ends of this shaft fit in holes and have oscillating bearing in the supporting shelf 69, which is herein shown as bolted to a flange of the intake manifold 44. This shelf is in two sections, screwed together to allow the insertion of the shaft 68. When the shift rod 47 is grasped by the hand of the driver, lifted slightly upward, and pushed forwardly and allowed to rest in its upper notch 53, the lifting lever 57 will be in its downward position, and thus will allow the gas rod 37 to fall with its rectangular opening 63 over the pin 64 in the upper extension of the carburetor lever 45. In this position thumb control is possible, and when thrown into this position from foot control adjustment, in which the tension of the foot control spring holds the carburetor lever in position to close the throttle, the latter will be closed when the rectangular opening 63 in the gas rod member 37 reengages the pin 64. Before reengagement, however, of the pin 64, by the rectangular opening 63, the cushioning spring 38 in the gas rod member 37 will force the gas rod opening 63 slightly beyond the pin 64, so that as the control ring 14 is moved to open the throttle, the opening 63 will drop down over the pin 64 in the backward movement of the gas rod member 37 from the tension of the spring 65. The spring 70, see Fig. 4, surrounds a telescopic rod and sleeve 71, 72, and is in threaded connection at its opposite ends, respectively, with the threaded thimble 73 pinned to the rod 71, at one end of the spring, and with a thread 74 on a thimble which is carried by a second rod 75. The rod 71 is provided at its extreme outer end with a button 101, acting as a stop, and said rod passes through an aperture in a pin 76 (see Figure 10), which is rotatably mounted in a hole near the outer end of the shift rod 47. The other rod 75 is provided at its end with an eye by which it is connected by a pivot 77 with the lower end of the carburetor lever 45.

This spring is placed under tension when the foot pedal control is rendered effective, but the tension of the spring is relieved when the control rod 47 is in the position shown in Figure 11, with the rectangular opening 63 in the gas rod member 37 over the pin 64, such position being that for thumb control through the ring 14. When the foot control is desired and the rod 47 is pulled backwardly to cause, through the connections 55, 57 and 37, the rectangular opening to be moved upwardly and out of contact with the pin 64, such movement of the rod 47, and slightly after it renders inoperative the thumb control, places tension upon the spring 70 which is applied to the carburetor lever 45 and resists the movement of that lever through the connections from the foot pedal 771.

The rod 71, which is a part of the spring assembly 70, passes through the head of a pin 76 rotatably carried by the rod 47. Referring to Figure 5, as shown therein, a tube 79 telescopically receives a rod 80 which is provided with a pin 81, while the tube is provided with a vent hole 82. This tube and rod assembly are connected at one end through an eye 83 on the tube, to pivot 77 at the lower end of the lever 45, and the rod member 80 is connected at the other end of the assembly through an eye 84 to a pin at the lower end of an arm 92, extending downwardly from the supplementary shaft 86. The shaft 86 is rotatably mounted in two brackets, one of which 89 is shown in Figure 11 as secured to the front wall of the partition 90. The opposite end of this shaft will be similarly mounted in another bracket, not shown. The main object of this shaft is to transmit the movement of the foot control pedal 77l to the carburetor lever 45 through the tube and rod assembly 79, 80. Inasmuch as the carburetor lever and the foot control pedal are not in the same line of movement. A coil spring 88 is suspended between an arm 89a extending from the supplementary shaft 86 and a projection 91 from the partition 90 and acts to hold the foot control pedal 77l in its erect position when the pressure of the foot is removed. A projection 2a, Figure 10, extending from bracket arm 89 limits the upward movement of the arm 89a.

The rod 93 connects the foot control pedal 77l with an arm 92 extending to the supplementary shaft 86, said shaft and the two arms thereon, 85, 92, being shown clearly in Figure 9.

Assuming that the mechanism is set for thumb control, if it is desired to shift it into an adjustment in which foot control can be used, the handle of the shift rod 47 is slightly lifted to disengage the upper notch from the bracket 48, and said rod is moved backwardly and allowed to rest in its lower notch 52. This action will bring the rod 55 rearwardly, and through it the lifting lever 57 into its erect position, in which the roller 60 which is pivoted between two sides of the lever 57, will have brought the gas rod 37 to its raised position, in which the rectangular opening 63 will be free from connection with the pin 64 on the carburetor control lever 45, thus allowing that lever to move freely in foot control use. By the same backward movement of the shift rod 47, the foot control spring 70 will be put under tension through the backward movement of the rod 71. A reverse movement of the shift rod 47 will remove the tension of the foot control spring, and permit the gas rod 37 to fall so that the opening 63 can be engaged with the pin 64 in the carburetor control lever 45 for thumb control use. In shifting into thumb control adjustment the tension of the foot control spring 70 is removed before the opening 63 in the gas rod member 37 comes low enough to reengage the pin 64, and in shifting into foot control adjustment the opening 63 leaves the pin 64 before the tension is put on the foot control spring 70.

When the shift rod 47 is adjusted for thumb control use in its downward position, the projection 87, Figure 11, extending from the supplementary shaft, has resting against its projecting member 94, Figures 10 and 11, extending from the shift rod 47, making impossible a forward movement of the foot control pedal, and thus locking it from use while the parts of the device are in thumb control adjustment.

There is a small loop of sheet metal 95 fitted for rotation on the end of projecting member 94 extending from the shift rod 47, Figure 10. Inside this loop is a small roller 95a fitted on the projecting member 94 on which it rotates, and resting against this roller is the upper end 96a of the coil spring 96, the coils of which surround the supplementary shaft 86, and the lower end 96b of this spring extends downwardly in a position in which it will not come in contact with the end of a gas rod 37 in thumb control use. When the shift rod 47 is drawn backward for foot control adjustment, the upper end of this spring is retracted, in the direction shown by arrows, and this brings the end of the lower part 96b of the spring against a tubular roller 97 fitted on the pin 33, Figures 6 and 11, connecting the gas rod 37 with the intermediate lever, 26, 32. By the spring thus resting against this roller, a resistance to the movement of the control ring 24 is effected in foot control adjustment, thus acting as a warning to the driver to set the adjustment as he desires it, in the event that he has failed to do so before. In such case the tension of the spring 96 serves to hold steadier against vibration the parts it presses against. But if the control ring should be moved in foot control adjustment with this added resistance, it would be without any effect on the gas supply, inasmuch as the rectangular notch 63 in the gas rod would be held above the pin 64 in the carburetor lever.

It will be observed from Figure 11 of the drawings where the parts are shown in the positions which they occupy when the connections between the control ring 24 and carburetor lever 45 have been established for so-called thumb control of the gas supply, that the distance between a stop 100 on the outer end of the rod 55 and the upper extremity of the lever 57, to be engaged by said stop, is less than the distance between the perforated pin 76 through which the rod 71 passes and the stop button 101 on the outer end of that rod. Accordingly, when the shift rod 47 is pulled to change from thumb control to foot control, engagement between the parts 100 and 58 takes place earlier than engagement between parts 76 and 101. This causes a rocking of the lever 57 to lift the rod 37 and remove the rectangular notch 63 from engagement with the pin 64 before any tension is applied to the spring 70, which of course only follows engagement between 76 and 101 in the outward pull of the rod 47. The same is true, in reverse order, when the rod 47 is pushed outwardly in the change from foot control to thumb control. From this it follows, as previously stated, that tension is not put upon the spring 70 until shortly after the connection between the carburetor lever 45 and the control ring 24 is interrupted, but at the same time the tension on said spring is relieved at a period slightly prior to the reengagement of the gas rod 37 with the carburetor lever 45; that is, when the notch 63 is dropped over the pin 64.

A means for locking the control ring rigidly with the steering wheel in foot control use, when so desired, is supplied by the thumb screw 98 fitted on a spoke 18 of the steering wheel, and which is adapted to engage a receiving threaded aperture 99 in the diametrically opposed bar 13 of the control ring.

Having thus described my invention, what I claim is:

1. In a control means for motor vehicles, the combination of a steering wheel, of a controlling ring located concentrically within said wheel close to the rim thereof, anti-friction means between said wheel and ring, and connections from said ring to the gas controlling devices.

2. A controlling device for motor vehicles comprising a ring concentric with the steering wheel and located within the same, rubber covered thumb grips rounded over the top carried by said ring, and connections from said ring to the gas controlling means of the vehicle.

3. A controlling device for vehicles comprising, in combination with the steering wheel of the vehicle, a ring within said wheel, connections from said ring to the gas control means, a foot pedal and connections from said pedal to said gas controlling means, means for alternately rendering inoperative the gas control through said ring and said pedal, a spring, and connections between said spring and said gas control means, and means which places tension upon said spring when the foot control through said pedal is rendered operative but which removes the tension from said spring when the shift is made from foot control to control through said ring.

4. A dual control means for motor vehicles comprising, in combination, a ring mounted for rotation within the steering wheel of the vehicle, means for controlling the gas supply to the motor including a lever, connections between said lever and ring, a pedal and connections between said pedal and lever, means for temporarily interrupting the connections between said ring and lever and for establishing connections between said pedal and lever, a spring with means for placing said spring under tension when the connections between said lever and ring are interrupted, and for relieving the tension on said spring when the connections between said ring and lever are restored.

5. A control means for motor vehicles comprising, in combination, a ring rotatably supported within the steering wheel of the vehicle, a lever adapted to be connected with the gas controlling means for the carburetor, connections between said ring and lever constructed for interruption, a pedal and connections therefrom to said lever, means for temporarily interrupting the connection between said ring and lever and for establishing operative connection between the pedal and lever, and a spring with means for placing said spring under tension when the connections between said ring and lever are interrupted, and the connections between said pedal and lever established, and for relieving the tension upon said spring when the connections between said ring and lever are re-established and the operative connection between said pedal and lever are interrupted.

6. In a controlling means for motor vehicles, the combination of a steering wheel, a ring for controlling the gas supply to the car through the operator's thumbs, mounted for rotary movement within the steering wheel and independently thereof, connections between said ring and a carburetor controlling lever, a pedal and connections therefrom to said lever, means for temporarily interrupting the connections between said ring and lever, a spring with means for placing said spring under tension following the interruption of said connections, means for establishing operative connection between the foot pedal and said lever following the interruption of the connections between the ring and lever, whereby the spring is placed under tension to resist the movements of said pedal as the latter is depressed for increasing the gas supply to the carburetor.

7. In a control device for motor vehicles, the combination of the steering wheel of the vehicle, of a ring mounted for rotary movements within said wheel and adapted for movements, independently of the steering movements, by the operator's thumb, connections from said ring to the carburetor supply devices, and means for temporarily locking said ring to the steering wheel to prevent independent movements of said wheel and ring, and a pedal and connections to said carburetor control devices, arranged for operation independent of the operation of the carburetor supply devices by said ring.

8. In a control device for motor vehicles, the combination with a ring rotatively mounted within the steering wheel of the vehicle, connections from said ring to the carburetor control lever, a pedal and connections to said lever, means for temporarily interrupting the connections between said ring and lever, and a spring connected with said lever with means for placing the spring under tension when said connections are interrupted, for increasing the resistance to the movement of the control ring when the pedal is in operation.

9. A controlling mechanism for motor vehicles, comprising in combination with the steering wheel of the vehicle, of a ring supported on the steering wheel for turning movements within it, means by which the ring turns with the movement of the steering wheel in the act of guiding the car without affecting the gas supply, a pedal, connections from said pedal to a gas supplying means, a spring having connection with said last means and resiliently opposing the transmission of pressure from said pedal to said means, means for relieving the tension upon said spring, and connections between said ring and said gas supplying means operative when the tension upon said spring is relieved.

10. A controlling device for motor vehicles, comprising in combination with the steering wheel, a steering wheel hub, and the steering post, a concentrically located ring within said wheel fixed against vertical movements and confined to rotary movements, a downwardly extending cylindrical extension of said hub on which slides vertically a cylindrical sleeve, a rod arranged for reciprocation by said sleeve independently of the steering wheel movements of the vehicle, and connections between said rod and the gas controlling means for the vehicle.

11. A controlling device for motor vehicles, comprising in combination with the steering wheel, a steering wheel post, a hub on said wheel, a cylindrical extension of said hub surrounding the steering wheel post, a concentrically located ring within said wheel, connections from said ring to the gas controlling means of the vehicle including a vertically sliding sleeve on said cylindrical extension, a rod connected with said sleeve and arranged for reciprocation therewith, connections between said ring and sleeve to effect reciprocation of the sleeve through rotation of the ring, connections between said rod and the gas controlling means for the vehicle, a carburetor controlling spring which resiliently resists the movement of the gas controlling means of the carburetor, and means for reciprocation of said rod upon rotation of said ring to operate the carburetor controlling means independently of said spring.

JAMES HARALSON PACE.